(12) United States Patent
Gantman

(10) Patent No.: US 9,325,684 B2
(45) Date of Patent: Apr. 26, 2016

(54) METHOD FOR AUTHENTICATING A DEVICE CONNECTION FOR A WEBSITE ACCESS WITHOUT USING A WEBSITE PASSWORD

(71) Applicant: QUALCOMM Incorporated, San Diego, CA (US)

(72) Inventor: Alexander Gantman, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 140 days.

(21) Appl. No.: 13/958,331

(22) Filed: Aug. 2, 2013

(65) Prior Publication Data

US 2015/0040200 A1    Feb. 5, 2015

(51) Int. Cl.
*H04L 29/06* (2006.01)
*G06F 21/12* (2013.01)
*G06F 21/44* (2013.01)
*H04L 29/08* (2006.01)

(52) U.S. Cl.
CPC .............. *H04L 63/08* (2013.01); *G06F 21/128* (2013.01); *G06F 21/44* (2013.01); *H04L 63/18* (2013.01); *H04L 67/02* (2013.01)

(58) Field of Classification Search
CPC ....... H04L 63/08; H04L 63/18; G06F 21/128; G06F 21/44
USPC .......................... 726/1, 4, 7, 26; 709/223, 228
See application file for complete search history.

(56) References Cited

U.S. PATENT DOCUMENTS

| | | | |
|---|---|---|---|
| 7,353,283 B2 | 4/2008 | Henaff et al. | |
| 7,673,135 B2* | 3/2010 | Chin et al. | 713/159 |
| 8,065,424 B2 | 11/2011 | Foresti et al. | |
| 8,261,087 B2 | 9/2012 | Fort et al. | |
| 8,300,634 B2 | 10/2012 | Narayanaswamy et al. | |
| 8,402,554 B2* | 3/2013 | Thomas | G06F 17/30867 715/745 |
| 2006/0086798 A1* | 4/2006 | Robertson et al. | 235/462.1 |
| 2007/0288623 A1* | 12/2007 | Kato et al. | 709/223 |
| 2008/0270571 A1 | 10/2008 | Walker et al. | |
| 2009/0125999 A1 | 5/2009 | Calbucci | |
| 2009/0262668 A1 | 10/2009 | Hemar et al. | |
| 2010/0211796 A1* | 8/2010 | Gailey et al. | 713/182 |
| 2012/0260322 A1* | 10/2012 | Logan et al. | 726/6 |
| 2016/0005032 A1* | 1/2016 | Yau | G06Q 20/3678 705/69 |

OTHER PUBLICATIONS

Aijaz, Fahad, et al. "Enabling resource-oriented Mobile Web Server for short-lived services." Communications (MICC), 2009 IEEE 9th Malaysia International Conference on. IEEE, 2009 (pp. 392-396).*

(Continued)

*Primary Examiner* — Kari Schmidt
(74) *Attorney, Agent, or Firm* — Loza & Loza, LLP

(57) ABSTRACT

A method herein is for authenticating a device connection for website access without using a website password. In the method, a web server receives an access request over the device connection from a device requesting access to a website based on a pre-established identity. The web server, in response to the access request, forwards an access cookie to the device over the device connection and forwards an activation URL to an address associated with the pre-established identity. The web server receives a request for the forwarded activation URL and, using the access cookie, grants access to the device over the device connection.

33 Claims, 3 Drawing Sheets

(56) References Cited

OTHER PUBLICATIONS

Ghiani, Giuseppe, Fabio Paternò, and Carmen Santoro. "Push and pull of web user interfaces in multi-device environments." Proceedings of the International Working Conference on Advanced Visual Interfaces. ACM, 2012 (pp. 10-17).*

International Search Report and Written Opinion—PCT/US2014/048647—ISA/EPO—Oct. 27, 2014.

Salensminde K., et al., "A Simple Password Less Authentication System for Web Sites", Information Technology: New Generations (ITNG), 2010 Seventh International Conference on, IEEE, Piscataway, NJ, USA, Apr. 12, 2010, pp. 132-137, XP031702383, ISBN: 978-1-4244-6270-4 abstract p. 132, right-hand column, lines 37-41 p. 133, left-hand column, lines 1-12, 29-34, 40-53 p. 135, left-hand column, line 49-line 58 p. 135, right-hand column, lines 27-31,35.

* cited by examiner

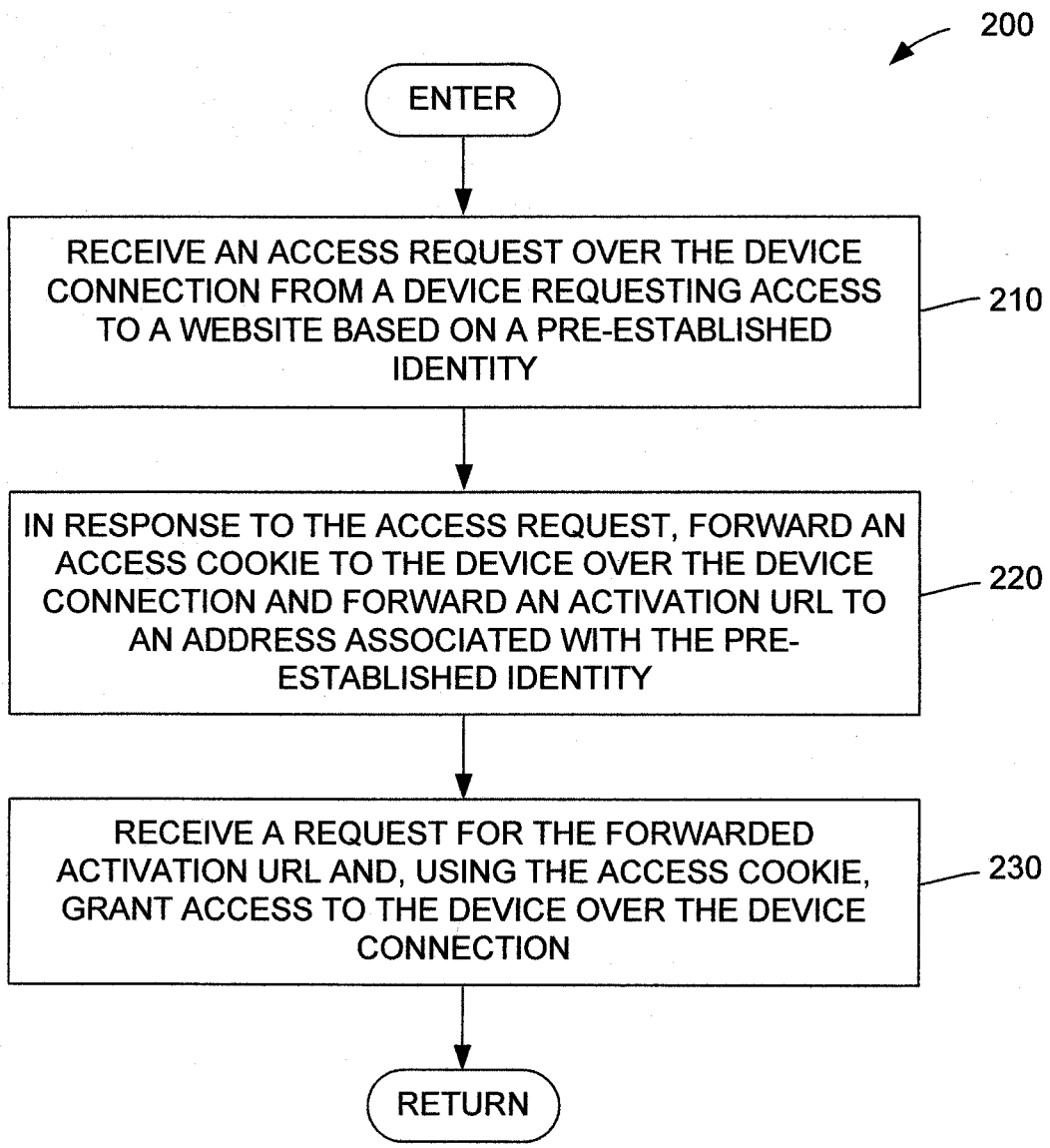

METHOD FOR AUTHENTICATING A DEVICE CONNECTION FOR A WEBSITE ACCESS WITHOUT USING A WEBSITE PASSWORD

BACKGROUND

1. Field

The present invention relates generally to a technique for eliminating passwords for account access to websites.

2. Background

Many websites require a username and password to authenticate a user and permit user access to the website. A user who seldom uses a website may forget the password for the website. Also, some websites use cookies to store authentication information between sessions, allowing the user to use the website over multiple sessions without reentering the user's password. For frequency visited websites, the authentication information stored in the cookies on the user's computer is relatively fresh, and the user may not need to enter their username and password for a long period of time. Because the user may not need to frequently enter the password, the user may forget the password of an often visited website.

Most websites that require user passwords provide a password reset mechanism that allows the user to receive a new password, typically by means of an email to an address provided by the user when registering for access to the website. Generally, a user may reset their password at any time so, in essence, as long as a user remembers their username, they can forget their password from one session to the next.

However, the forgotten password is still recognized by the website, and an attacker who can figure it out by, for example, guessing or reversing a compromised hash, may access the website. This highlights an undesirable side-effect of the password reset mechanism. The forgotten password is useless to the user, but not to an attacker.

There is therefore a need for a technique for authenticated website access without requiring a password.

SUMMARY

An aspect of the present invention may reside in a method for authenticating a device connection for website access without using a website password. In the method, a web server receives an access request over the device connection from a device requesting access to a website based on a pre-established identity. The web server, in response to the access request, forwards an access cookie to the device over the device connection and forwards an activation URL to an address associated with the pre-established identity. The web server receives a request for the forwarded activation URL and, using the access cookie, grants access to the device over the device connection.

In more detailed aspects of the invention, the access cookie may include a session identity. An access state of the device connection may be stored on the web server. The web server may forward the activation URL in an email, or in an SMS message.

In other more detailed aspects of the invention, another device may be used to invoke the activation URL to activate the device connection. The pre-established identity may be a username, or an email address.

Another aspect of the invention may reside in a station for authenticating a device connection for website access without using a website password, comprising: means for receiving an access request over the device connection from a device requesting access to a website based on a pre-established identity; means for forwarding an access cookie to the device over the device connection and forwarding an activation URL to an address associated with the pre-established identity in response to the access request; and means for receiving a request for the forwarded activation URL and, using the access cookie, granting access to the device over the device connection.

Another aspect of the invention may reside in a station for authenticating a device connection for website access without using a website password, comprising: a processor configured to: receive an access request over the device connection from a device requesting access to a website based on a pre-established identity; forward an access cookie to the device over the device connection and forward an activation URL to an address associated with the pre-established identity in response to the access request; and receive a request for the forwarded activation URL and, using the access cookie, grant access to the device over the device connection.

Another aspect of the invention may reside in a computer program product, comprising: computer-readable medium, comprising: code for causing a computer to receive an access request over the device connection from a device requesting access to a website based on a pre-established identity; code for causing a computer to forward an access cookie to the device over the device connection and forward an activation URL to an address associated with the pre-established identity in response to the access request; and code for causing a computer to receive a request for the forwarded activation URL and, using the access cookie, grant access to the device over the device connection.

BRIEF DESCRIPTION OF THE DRAWINGS

FIG. 2 is a flow diagram of a method for authenticating a device connection for website access without using a website password, according to the present invention.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
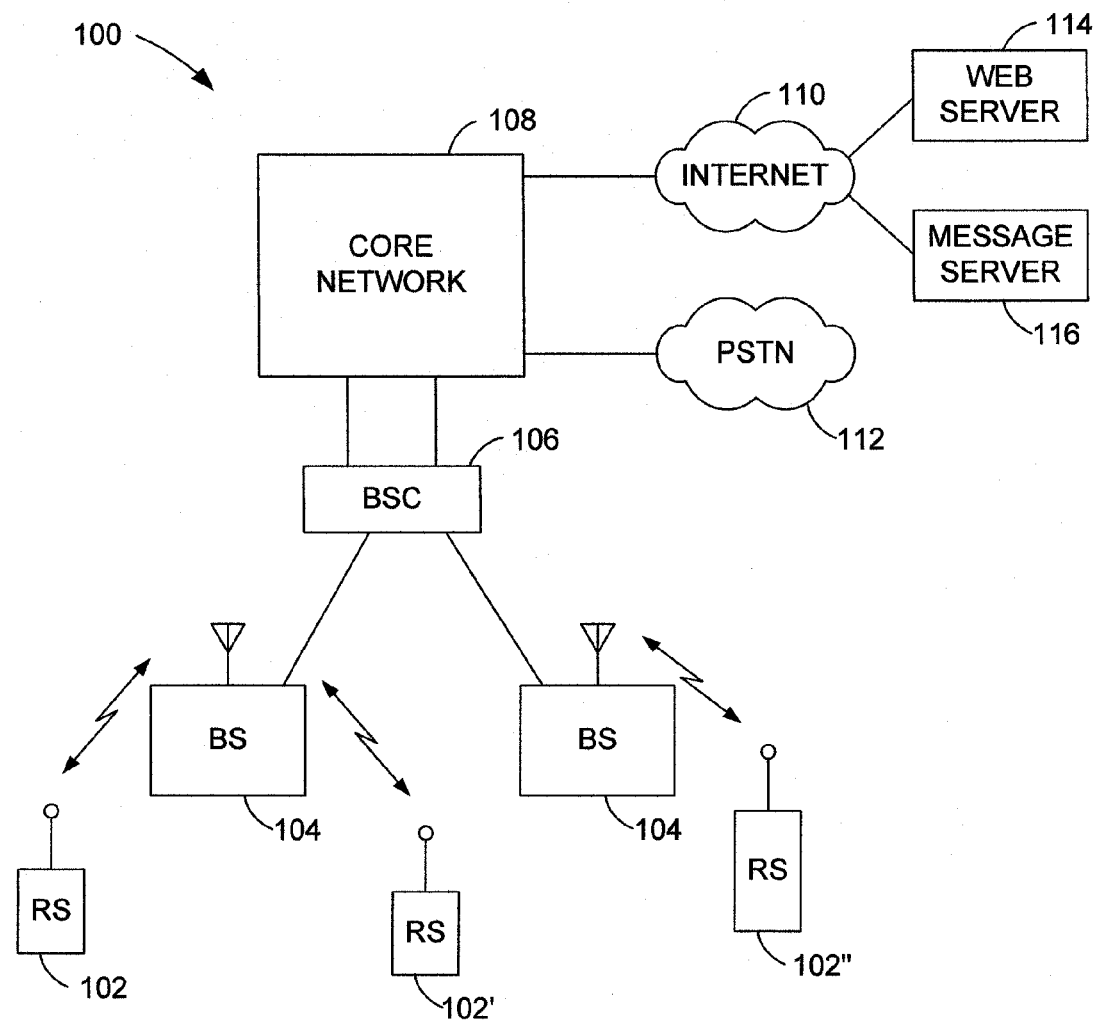
FIG. 1 is a block diagram of an example of a wireless communication system.

With reference to FIGS. 1 and 2, an aspect of the present invention may reside in a method 200 for authenticating a device connection for website access without using a website password. In the method, a web server 114 receives an access request over the device connection from a device 102 requesting access to a website based on a pre-established identity (step 210). The web server, in response to the access request, forwards an access cookie to the device 102 over the device connection and forwards an activation URL to an address associated with the pre-established identity (step 220). The web server receives a request for the forwarded activation URL and, using the access cookie, grants access to the device over the device connection (step 230).

In more detailed aspects of the invention, the access cookie may include a session identity. An access state of the device connection may be stored on the web server 114. The web server may forward the activation URL in an email, or in an SMS message.

In other more detailed aspects of the invention, another device 102' may be used to invoke the activation URL to activate the device connection. The pre-established identity may be a username, or an email address.

The present invention may be particularly advantageous when a new device 102 is being used or setup to access a website. Certain features may not be available before setup, such as email, or certain features may not be available on the new device, such as SMS messaging on a tablet or laptop having only WiFi connectivity. As an example, a user may get a new tablet and want to use it to log into an account for a website or web application before setting up a messaging application such as email.

With the present technique, a cookie is immediately forwarded to the requesting device 102, and the activation URL may be accessed by any device 102', such as a smartphone have cellular data connectivity. Once the other device, e.g., the smartphone, exercises the activation URL, the requesting device is authenticated for a connection session using the forwarded cookie. The website's server 114 would not acknowledge the forwarded cookie until the activation URL is exercised. After activation, the requesting device merely refreshes a web page of the website, and the requesting device is authenticated and logged in without any further action or input needed by the user at the requesting device.

In the present invention, the concept of a connection is made explicit, and allows a user to be active in managing the connections associated with the user's username. The website may maintain a list of active connections in an account profile, and the user may review the list of active connections. Also, a user may create temporary connections to use on a borrowed or loaned device, etc.

Figure 3:
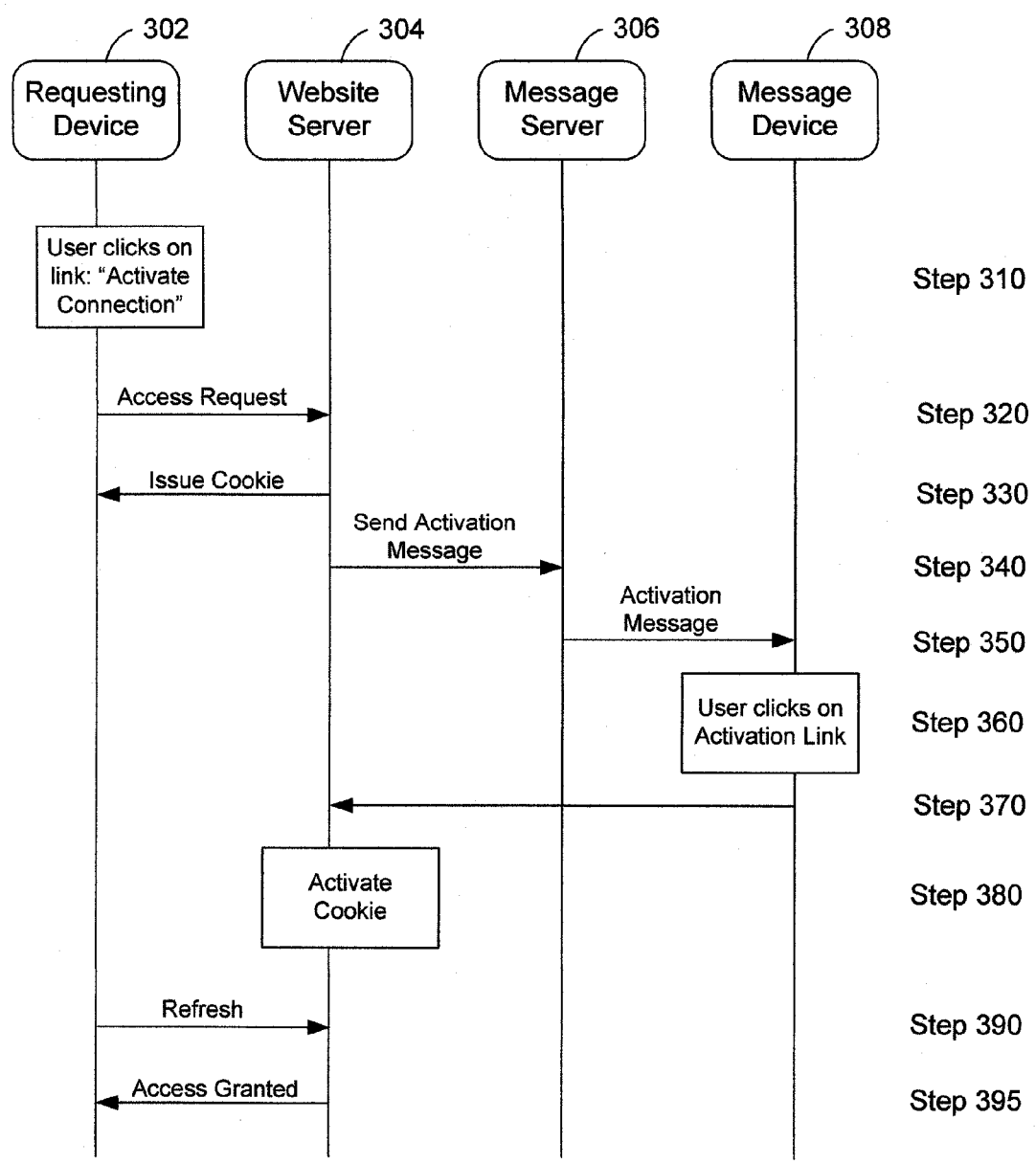
FIG. 3 is a more detailed flow diagram of the method for authenticating a device connection for website access without using a website password.

With reference to FIG. 3, according to the present invention, the user, using a requesting device 302 (a new device 102 (FIG. 1) or a device 102 with an expired or revoked connection), may click on an "Activate Connection" link on a connection activation web page of the website (step 310). Clicking the link may cause the device to send an access request to the website server 304, e.g., web server 114 (FIG. 1) (step 320). Before clicking the link, or in response to an inquiry, the user would enter a username (or similar unique identifier such as an email address, phone number, or the like). The website server may issue a cookie to the requesting device (step 330). The cookie has all the access information needed to permit the device to access the website. However, the website server will not acknowledge the cookie for authentication until the device connection is activated.

The website server 304 may send or forward an activation message to a message server 306 (step 340). The message server may be configured to send or forward an email message, an SMS message, or similar out-of-band message, in accordance with the capabilities of a message device 308, e.g., RS 102' (FIG. 1), that receives the message (step 350). The message may include a link with an activation URL. By clicking on the link (step 360), the user causes the message device to forward a request for the activation URL to the website server 304 (step 370). The website server receives the request for the activation URL, and may return a confirmation message to the message device. More importantly, the website server will now recognize the cookie on the requesting device. Thus, the cookie is activated by the website server (step 380). This authenticates the new device connection with the requesting device 302, the new device connection meaning the connection over which the access request that triggered the activation message with the "connection activation" link was sent, and not meaning the other connection associated with the message device 308 that exercised the link for the activation URL. Refreshing the web page on the requesting device (step 390) results in access being granted to the requesting device over the new device connection (step 395).

Figure 4:
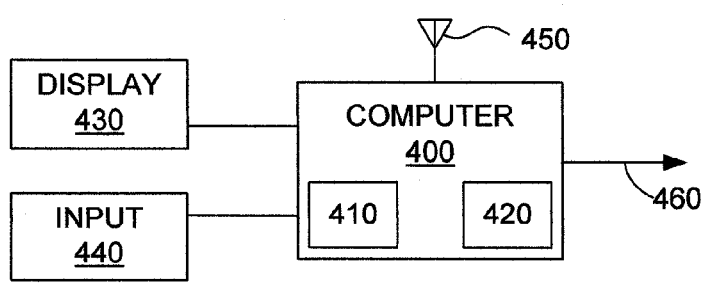
FIG. 4 is a block diagram of a computer including a processor and a memory.

With further reference to FIG. 4, another aspect of the invention may reside in a station (e.g., web server 114 and/or computer 400) for authenticating a device connection for website access without using a website password, comprising: means 410 for receiving an access request over the device connection from a device 102 requesting access to a website based on a pre-established identity; means 410 for forwarding an access cookie to the device over the device connection and forwarding an activation URL to an address associated with the pre-established identity in response to the access request; and means 410 for receiving a request for the forwarded activation URL and, using the access cookie, granting access to the device over the device connection.

Another aspect of the invention may reside in a station (e.g., web server 114 and/or computer 400) for authenticating a device connection for website access without using a website password, comprising: a processor 410 configured to: receive an access request over the device connection from a device 102 requesting access to a website based on a pre-established identity; forward an access cookie to the device over the device connection and forward an activation URL to an address associated with the pre-established identity in response to the access request; and receive a request for the forwarded activation URL and, using the access cookie, grant access to the device over the device connection.

Another aspect of the invention may reside in a computer program product, comprising: computer-readable medium 420, comprising: code for causing a computer 400 to receive an access request over the device connection from a device 102 requesting access to a website based on a pre-established identity; code for causing a computer to forward an access cookie to the device over the device connection and forward an activation URL to an address associated with the pre-established identity in response to the access request; and code for causing a computer to receive a request for the forwarded activation URL and, using the access cookie, grant access to the device over the device connection.

The station 102 may be a remote station RS comprising a computer 400 that includes a processor 410, a storage medium 420 such as memory and/or a disk drive, a display 430, and an input such as a keypad 440, and a wireless connection 450 and/or a wired connection 460 which may include data connection to the internet 110.

With reference to FIG. 1, a wireless remote station (RS) 102 (e.g. a mobile station MS) may communicate with one or more base stations (BS) 104 of a wireless communication system 100. Each BS may support a number of other RSs 102', 102'', etc. The wireless communication system 100 may further include one or more base station controllers (BSC) 106, and a core network 108. Core network may be connected to an Internet 110 and a Public Switched Telephone Network (PSTN) 112 via suitable backhauls. A typical wireless mobile station may include a handheld phone, or a laptop computer. The wireless communication system 100 may employ any one of a number of multiple access techniques such as code division multiple access (CDMA), time division multiple access (TDMA), frequency division multiple access (FDMA), space division multiple access (SDMA), polarization division multiple access (PDMA), or other modulation techniques known in the art.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both non-transitory computer-readable storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for authenticating a device connection for website access without using a website password, comprising:
   receiving, by a web server, an access request over the device connection from a device requesting access to a website based on a pre-established identity;
   forwarding, by the web server in response to the access request, an access cookie to the device over the device connection and an activation Uniform Resource Locator (URL) to an address associated with the pre-established identity for reception by a message device using the address, wherein the access cookie is not activated by the web server for granting access when the access cookie is forwarded to the device over the device connection;
   activating, by the web server upon receiving a request for the activation URL, the access cookie to grant the device access over the device connection, wherein the request is received in response to selection of the forwarded activation URL at the message device; and
   granting, by the web server in response to receiving a refreshed access request from the device, access to the website over the device connection based on the activated access cookie.

2. The method of claim 1, wherein the access cookie includes a session identity.

3. The method of claim 1, wherein an access state of the device connection is stored on the web server.

4. The method of claim 1, wherein the web server forwards the activation Uniform Resource Locator (URL) in an email.

5. The method of claim 1, wherein the web server forwards the activation Uniform Resource Locator (URL) in a Short Message Service (SMS) message.

6. The method of claim 1, wherein the message device is used to invoke the activation Uniform Resource Locator (URL).

7. The method of claim 1, wherein the pre-established identity is a username.

8. The method of claim 1, wherein the pre-established identity is an email address.

9. The method of claim 1, wherein device is granted access over the device connection for a connection session.

10. A station for authenticating a device connection for website access without using a website password, comprising:
   a hardware processor and memory for storing instructions configured to be executable by the processor for implementing:
   means for receiving an access request over the device connection from a device requesting access to a website based on a pre-established identity;
   means for forwarding an access cookie to the device over the device connection forwarding an activation Uniform Resource Locator (URL) to an address associated with the pre-established identity for reception by a message device using the address in response to the access request, wherein the access cookie is not activated by the station for granting access when the access cookie is forwarded to the device over the device connection;
   means for activating the access cookie, upon receiving a request for the activation URL, to grant the device access over the device connection, wherein the request is received in response to selection of the forwarded activation URL at the message device; and
   means for granting access to the website over the device connection based on the activated access cookie in response to receiving a refreshed access request from the device.

11. The station of claim 10, wherein the access cookie includes a session identity.

12. The station of claim 10, wherein an access state of the device connection is stored on the station.

13. The station of claim 10, wherein the activation Uniform Resource Locator (URL) is forwarded in an email.

14. The station of claim 10, wherein the activation Uniform Resource Locator (URL) is forwarded in a Short Message Service (SMS) message.

15. The station of claim 10, wherein the message device is used to invoke the activation Uniform Resource Locator (URL).

16. The station of claim 10, wherein the pre-established identity is a username.

17. The station of claim 10, wherein the pre-established identity is an email address.

18. A station for authenticating a device connection for website access without using a website password, comprising:
   a hardware processor configured to:
   receive an access request over the device connection from a device requesting access to a website based on a pre-established identity;
   forward an access cookie to the device over the device connection and forward an activation Uniform Resource Locator (URL) to an address associated with the pre-established identity for reception by a message device using the address in response to the access request, wherein the access cookie is not activated by the station for granting access when the access cookie is forwarded to the device over the device connection;
   activate the access cookie, upon receiving a request for the activation URL, to grant the device access over the device connection, wherein the request is received in response to selection of the forwarded activation URL at the message device; and
   grant access to the website over the device connection based on the activated access cookie in response to receiving a refreshed access request from the device.

19. The station of claim 18, wherein the access cookie includes a session identity.

20. The station of claim 18, further comprising:
   a memory configured to store an access state of the device connection.

21. The station of claim 18, wherein the activation Uniform Resource Locator (URL) is forwarded in an email.

22. The station of claim 18, wherein the activation Uniform Resource Locator (URL) is forwarded in a Short Message Service (SMS) message.

23. The station of claim 18, wherein the message device is used to invoke the activation Uniform Resource Locator (URL).

24. The station of claim 18, wherein the pre-established identity is a username.

25. The station of claim 18, wherein the pre-established identity is an email address.

26. A non-transitory computer-readable storage medium, comprising:
   code for causing a computer to receive an access request over the device connection from a device requesting access to a website based on a pre-established identity;
   code for causing a computer to forward an access cookie to the device over the device connection and forward an activation Uniform Resource Locator (URL) to an address associated with the pre-established identity for reception by a message device using the address in response to the access request, wherein the access cookie is not activated by a web server for granting access when the access cookie is forwarded to the device over the device connection;
   code for causing a computer to activate the access cookie, upon receiving a request for the activation URL, to grant the device access over the device connection, wherein the request is received in response to selection of the forwarded activation URL at the message device; and
   code for causing a computer to grant access to the website over the device connection based on the activated access cookie in response to receiving a refreshed access request from the device.

27. The non-transitory computer-readable storage medium of claim 26, wherein the access cookie includes a session identity.

28. The non-transitory computer-readable storage medium of claim 26, further comprising:
   code for causing a computer to store an access state of the device connection.

29. The non-transitory computer-readable storage medium of claim 26, wherein the activation Uniform Resource Locator (URL) is forwarded in an email.

30. The non-transitory computer-readable storage medium of claim 26, wherein the activation Uniform Resource Locator (URL) is forwarded in a Short Message Service (SMS) message.

31. The non-transitory computer-readable storage medium of claim 26, wherein the message device is used to invoke the activation Uniform Resource Locator (URL).

32. The non-transitory computer-readable storage medium of claim 26, wherein the pre-established identity is a username.

33. The non-transitory computer-readable storage medium of claim 26, wherein the pre-established identity is an email address.

* * * * *